US008914513B2

(12) United States Patent
Dutta et al.

(10) Patent No.: US 8,914,513 B2
(45) Date of Patent: Dec. 16, 2014

(54) HIERARCHICAL DEFRAGMENTATION OF RESOURCES IN DATA CENTERS

(75) Inventors: Debojyoti Dutta, Santa Clara, CA (US); Ashok Ganesan, San Jose, CA (US); Subrata Banerjee, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 398 days.

(21) Appl. No.: 13/167,322

(22) Filed: Jun. 23, 2011

(65) Prior Publication Data

US 2012/0331147 A1 Dec. 27, 2012

(51) Int. Cl.
*G06F 15/173* (2006.01)
*G06F 9/06* (2006.01)

(52) U.S. Cl.
CPC ........................... *G06F 9/06* (2013.01)
USPC ............................ 709/226; 709/224

(58) Field of Classification Search
USPC ................................. 709/226; 718/1
See application file for complete search history.

(56) References Cited

U.S. PATENT DOCUMENTS

| | | | |
|---|---|---|---|
| 6,606,628 B1 | 8/2003 | Monsen et al. | |
| 7,861,102 B1* | 12/2010 | Ranganathan et al. | 713/300 |
| 8,171,142 B2* | 5/2012 | Kolin et al. | 709/226 |
| 8,271,814 B2* | 9/2012 | Padmanabhan et al. | 713/310 |
| 2006/0168108 A1 | 7/2006 | Hake et al. | |
| 2008/0104587 A1* | 5/2008 | Magenheimer et al. | 718/1 |
| 2009/0259345 A1* | 10/2009 | Kato et al. | 700/295 |
| 2010/0115509 A1* | 5/2010 | Kern et al. | 718/1 |
| 2010/0332889 A1* | 12/2010 | Shneorson et al. | 714/2 |
| 2011/0099267 A1* | 4/2011 | Suri et al. | 709/224 |
| 2011/0185064 A1* | 7/2011 | Head et al. | 709/226 |
| 2011/0282982 A1* | 11/2011 | Jain | 709/223 |
| 2012/0030356 A1* | 2/2012 | Fletcher | 709/226 |
| 2012/0204051 A1* | 8/2012 | Murakami et al. | 713/324 |
| 2012/0209989 A1* | 8/2012 | Stewart et al. | 709/224 |
| 2012/0254400 A1* | 10/2012 | Iyengar et al. | 709/224 |
| 2012/0311370 A1* | 12/2012 | Dasgupta et al. | 713/340 |
| 2012/0331147 A1* | 12/2012 | Dutta et al. | 709/226 |

FOREIGN PATENT DOCUMENTS

WO   WO 2011043317 A1 *  4/2011

OTHER PUBLICATIONS http://blog.raxco.com/blog/defrag-vmware, Defrag VMware/Raxco Software pp. 1-15, Mar. 4, 2011.
http://www.nlyte.com/nlyte-product-information/nlyte-60-overview, Data Center Software/Infrastructure Management Software/nlyte 6.0, pp. 1-2.

* cited by examiner

*Primary Examiner* — Richard G Keehn
(74) *Attorney, Agent, or Firm* — Edell, Shapiro & Finnan, LLC

(57) ABSTRACT

Techniques are provided herein for defragmenting resources within a cloud computing system. The cloud computing system includes a plurality of servers deployed in a plurality of respective racks, wherein the respective racks are deployed in a pod of a data center. An element of the cloud computing system determines for each server in a given rack of servers a number of free resource slots available thereon and a number of resource slots in an idle state, and then further determines whether the number of free resource slots on a first server in the plurality of servers is greater than a predetermined threshold. When the number of free resource slots in the first server is greater than the predetermined threshold, a second server in the plurality of servers is identified with sufficient resource slots thereon to accommodate the number of resource slots in the idle state on the first server, and the resource slots in the idle state on the first server are caused to be migrated to the second server.

20 Claims, 6 Drawing Sheets

HIERARCHICAL DEFRAGMENTATION OF RESOURCES IN DATA CENTERS

TECHNICAL FIELD

The present disclosure relates to cloud computing systems and to techniques for managing equipment in a cloud computing system.

BACKGROUND

In a cloud computing environment, numerous cloud service requests are serviced in relatively short periods of time. In such an environment, it is highly beneficial to automate placement, rendering, and provisioning of cloud services within and between data centers, so that cloud service requests can be accommodated dynamically with minimal (and preferably no) human intervention.

Examples of cloud services include: compute services, network services, and storage services. Examples of network services include Layer 2 (L2) virtual local area network (VLAN) or Layer 3 (L3) virtual routing and forwarding (VRF) connectivity between various physical and logical elements in a data center, Layer 4 (L4) to Layer 7 (L7) services including firewalls and load balancers, Quality of Service (QoS), access control lists (ACLs), and accounting. These cloud services are supported by individual cloud elements including servers, racks of servers, racks of servers that may be grouped into clusters, and data center PODs, i.e., a collection of racks or servers and/or clusters.

Network management of cloud computing systems currently use orchestration tools which learn about all cloud elements within the data center, make all placement decisions for all cloud elements within the data center, and render and provision the cloud service request by communicating directly with each cloud element in the data center. Those skilled in the art will appreciate that effectively managing cloud elements can be particularly challenging.

DESCRIPTION OF EXAMPLE EMBODIMENTS

Overview

Techniques are provided herein for defragmenting resources within a cloud computing system. The cloud computing system includes a plurality of servers deployed in a plurality of respective racks, wherein the respective racks are deployed in a POD of a data center. An element of the cloud computing system determines for each server in a given rack of servers a number of free resource slots available thereon and a number of resource slots in an idle state, and then further determines whether the number of free resource slots on a first server in the plurality of servers is greater than a predetermined threshold. When the number of free resource slots in the first server is greater than the predetermined threshold, a second server in the plurality of servers is identified with sufficient resource slots thereon to accommodate the number of resource slots in the idle state on the first server, and the resource slots in the idle state on the first server are then caused to be migrated to the second server. Once servers on respective racks have been defragmented or consolidated, the techniques further enable hierarchical defragmentation of racks, clusters of racks, PODs, and data centers, all of which can lead to, among other things, powering down individual and collections of cloud network system equipment that is no longer needed for service.

Example Embodiments

Figure 1:
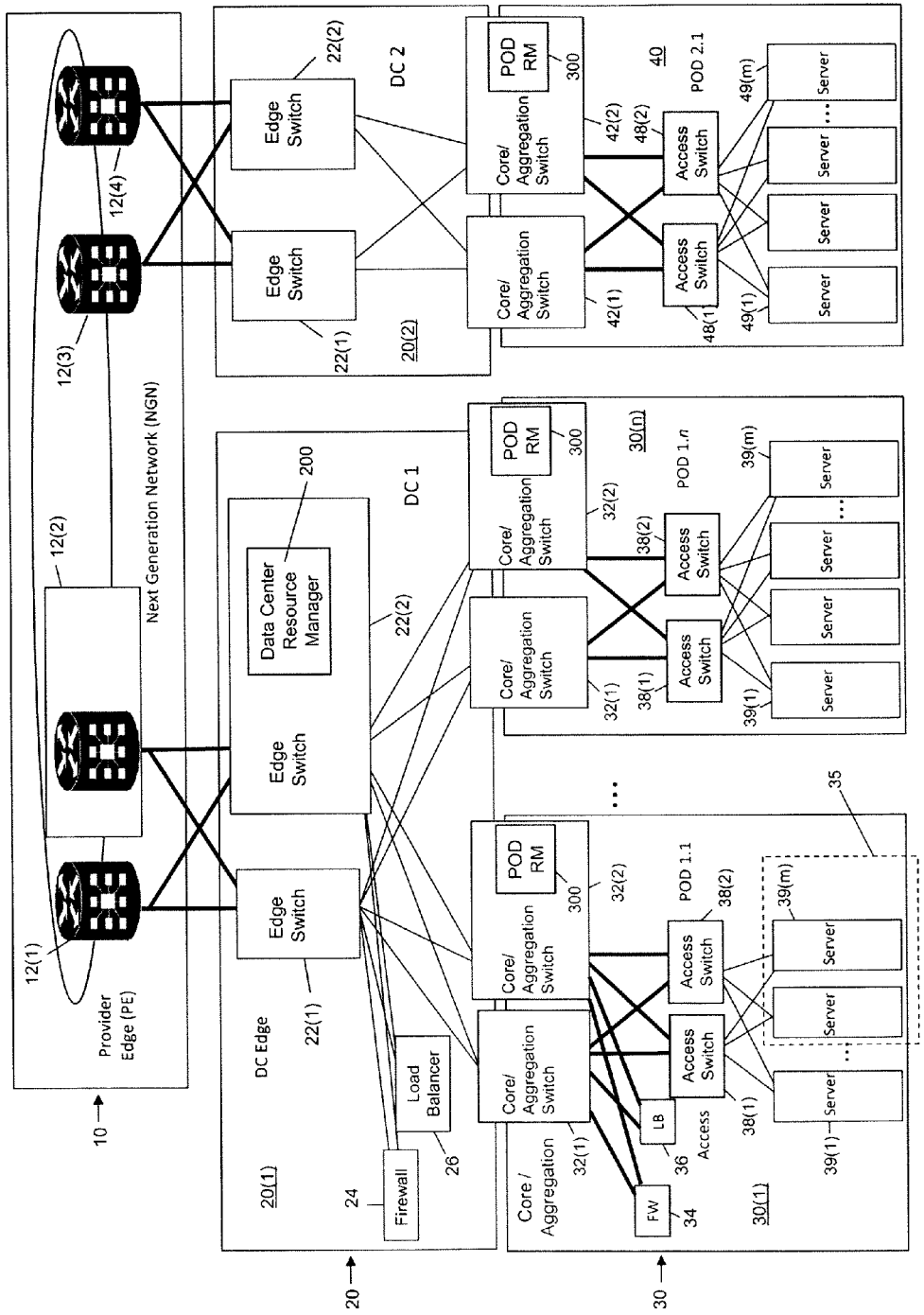
FIG. 1 is an example of a block diagram of a cloud computing system including elements configured to perform server, POD and data center level defragmentation of resources.

Referring first to FIG. 1, an example of a cloud computing system or environment is shown. The system comprises a plurality of hierarchical levels. The highest level is a network level 10, also referred to herein as a Next Generation Network (NGN) level. The next highest level is a data center (DC) level 20. Beneath the data center level 20 is a POD level 30. While FIG. 1 shows three levels in the hierarchy, this is only an example, as there may be additional levels. There are cloud elements in each hierarchical level. The cloud elements may comprise switches, routers, load balancers, firewalls, servers, racks of servers, clusters, network appliances or any device that is involved in providing a function to a cloud service request. For simplicity, the term "cloud element" is meant to encompass any of these devices.

The network level 10 connects multiple different data centers at the data center level 20, e.g., data center 20(1) labeled as DC 1 and data center 20(2) labeled as DC 2, and subsets of the data centers called "PODs" that are centered on aggregation switches within the data center. Again, the number of levels shown in FIG. 1 is an example. It is possible to deploy an arbitrary number of levels of hierarchy, possibly with different definitions than in this example. The hierarchy may follow the physical topology of the network but it is not required.

At least at the data center level 20 and POD level 30 of the hierarchy, there is at least one resource manager 200 or 300. As will be discussed below in detail, each resource manager 200, 300 operates to perform garbage collection-like or defragmentation operations on one or more cloud elements in an effort to eliminate resource "holes," i.e., unused resources that result in non-contiguous use of resources.

Still with reference to FIG. 1, in the network level 10, there are Provider Edge (PE) devices that perform routing and switching functions. FIG. 1 shows four PE devices 12(1)-12(4) as an example. At the data center level 20, there are edge switches, firewalls and load balancers. For example, in a first data center 20(1) labeled "DC 1" in FIG. 1, there are edge switches 22(1) and 22(2), a firewall device 24 and a load balancer device 26. The PEs 12(1) and 12(2) in the network level 10 are each connected to the edge switches 22(1) and 22(2). A resource manager 200 is shown as part of the edge switch 22(2) in data center 20(1). However, those skilled in the art will appreciate that the resource manager 200 may be hosted in other networking elements in the data center or in one or more virtual machines running on servers in the data center. The edge switches 22(1) and 22(2) are each connected to the firewall device 24 and load balancer device 26. Similarly, in data center 20(2), there are edge switches 22(1) and 22(2), and also a firewall device and a load balancer device. The firewall and load balancer devices in data center 20(2) are not shown in FIG. 1 for simplicity. Switch 22(2) in data center 20(2) includes a resource manager as well.

At the POD level 30, there are core/aggregation switches, firewalls, load balancers and web/application servers in each POD. The functions of the firewalls, load balancers, etc., may be hosted in a physical chassis or they may be hosted in a virtual machine executed on a computing element in the POD level 30. PODs 30(1)-30(n), labeled "POD 1.1"-"POD 1.n", are connected to data center 20(1), and POD 40 is connected to data center 20(2). PODs 30(1)-30(n) may be viewed as different processing domains with respect to the data center 20(1), and orchestration tools (not shown) within data center 20(1) may select which one (or more) of a plurality of processing domains in the POD level to be used for aspects of a cloud service received at data center 20(1). Generally speaking, data center 20(2) cannot select one of the PODs 30(1)-30(n) because they are in different processing domains, but data center 20(2) can select POD 40. In each of PODs 30(1)-30(n), there are core/aggregation switches 32(1) and 32(2), one or more firewall (FW) devices 34, one or more load balancer (LB) devices 36, access switches 38(1) and 38(2) and servers 39(1)-39(m). The firewall and load balancers are not shown in POD 30(n) for simplicity. Each server 39(1)-39(m) may run one or more virtual machine processes, i.e., virtual servers, in respective "slots". A slot or resource slot, as used herein, may also encompass a storage component such as a portion or an entirety of a disk drive or other memory or storage device. Further, several servers may be grouped together in a rack or in a cluster of racks, both indicated by reference numeral 35, as shown in the POD labeled POD 1.1. Although not shown, servers in other PODs may be likewise organized in clusters. PODs may contain no, one or multiple clusters of servers or racks of servers.

As shown further, there is a resource manager 300 in core/aggregation switch 32(2) in each of PODs 30(1)-30(n). The POD resource manager 300 may be hosted in other networking elements in the POD or in one or more virtual machines running on servers in the POD. In another form, the POD resource manager functionality may be distributed across multiple devices in the POD. Similarly, in POD 40 there are core/aggregation switches 42(1) and 42(2), access switches 48(1) and 48(2) and servers 49(1)-49(m). There is a POD resource manager 300 in core/aggregation switch 42(2). POD 40 also includes one or more firewalls and load balancers but they are omitted in FIG. 1 for simplicity.

Figure 2:
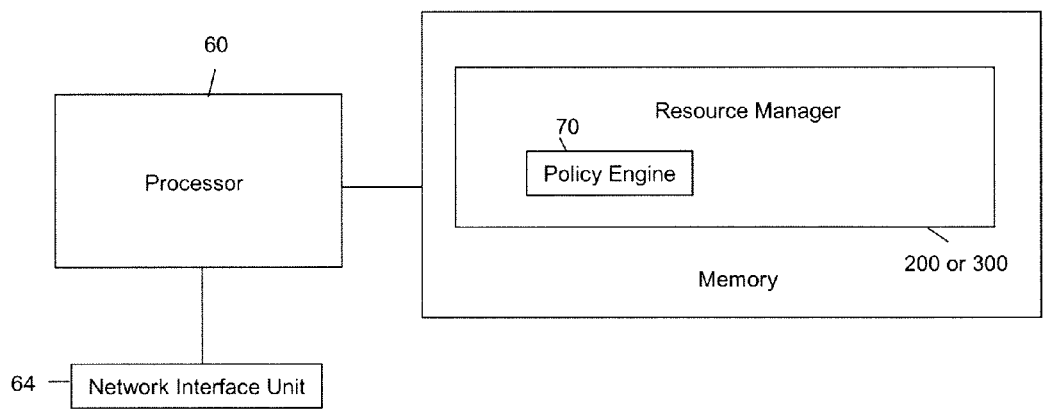
FIG. 2 is an example of a block diagram of a device, such as a switch, including a resource manager that is configured to perform defragmentation operations in connection with elements of the cloud computing system.

FIG. 2 shows an example of a block diagram of a device that is configured with a resource manager. This device may be (or be part of) an edge switch, e.g., edge switches 22(1) and/or 22(2) in data centers 20(1) and 20(2), core/aggregation switch, e.g., core/aggregation switches 32(1) and/or 32(2) in PODs 30(1)-30(n) and core/aggregation switches 42(1) and/or 42(2) in POD 40, or any network appliance device that is capable of communicating with other elements in a given hierarchical level. In the device, there is a processor 60, a memory 62 and a network interface unit 64. The memory 62 stores instructions for resource manager functionality. When the device is configured to be deployed in a data center, the instructions stored in the memory 62 may be for, at least, a data center level resource manager 200. When the device is configured to be deployed in a POD, the instructions stored in the memory 62 may be for, at least, a POD level resource manager 300. A resource manager 200, 300 may also include instructions for a policy engine 70, described further hereinafter. The network interface unit 64 is configured to perform communications (transmit and receive) over a network in order to communicate with other cloud elements and their embedded service rendering engine or abstract device broker.

The memory 62 shown in FIG. 2 is, for example, random access memory (RAM), but may comprise electrically erasable programmable read only memory (EEPROM) or other computer-readable memory in which computer software may be stored or encoded for execution by the processor 60. The processor 60 shown in FIG. 2 is configured to execute instructions stored in its associated memory for carrying out the techniques described herein. In particular, the processor 60 is configured to execute program logic instructions (i.e., software) stored or encoded in memory 62 for resource manager 200 that may also comprise the policy engine 70.

The operations of processor 60 may be implemented by logic encoded in one or more tangible computer readable storage media (e.g., embedded logic such as an application specific integrated circuit, digital signal processor instructions, software that is executed by a processor, etc). The resource manager 200 or 300 may take any of a variety of forms, so as to be encoded in one or more tangible media for execution, such as fixed logic or programmable logic (e.g. software/computer instructions executed by a processor) and the processor 60 may be an application specific integrated circuit (ASIC) that comprises fixed digital logic, or a combination thereof. For example, the processor 60 may be embodied by digital logic gates in a fixed or programmable digital logic integrated circuit, which digital logic gates are configured to perform the operations of the resource manager 200 or 300. In one form, the resource manager 200 or 300 is embodied in a processor or computer-readable memory medium (memory 62) that is encoded with instructions for execution by a processor (e.g., a processor 60) that, when executed by the processor, are operable to cause the processor to perform the operations described herein.

In a complex cloud computing environment like that shown in FIG. 1, thousands of requests for resources are made by clients and other entities within the cloud computing system, and those requests for resources are subsequently provisioned and the provisioned resources are employed, i.e., compute or storage resources are employed by clients. Later, when, for example, compute or storage requests have been completed, the resources associated with those requests are no longer needed and are de-provisioned. As a result, over time, multiple allocations and deallocations of resources take place within a data center and such allocations and deallocations can result in the resources within a data center becoming fragmented and scattered across and within PODs and data centers. That is, resources become non-contiguous in that only a few slots on a given server may end up running respective virtual servers, or only a few servers may end up operating in a given rack of servers. In an effort to reduce the presence of non-contiguous resources, embodiments described herein are configured to defragment or perform "garbage collection" in a hierarchical manner across servers, racks and PODs to obtain a more contiguous set of resources throughout the cloud computing system rather than resources that are deployed in a haphazard manner. Moreover, when the defragmentation process is complete it may be possible to shut down selected servers, racks or switches that may no longer be needed (i.e., are not needed to fulfill any requests for service) and, as a result, it may be possible to save electrical power that might be otherwise wasted.

In addition, embodiments described herein can enable improved resource allocation and optimize utilization. For example, and as will become apparent from the details below, defragmentation or reorganization of resources can improve performance of those resources, which may have been assigned across PODs or across racks when originally provisioned, but can now operate in a more consolidated manner.

Figure 3:
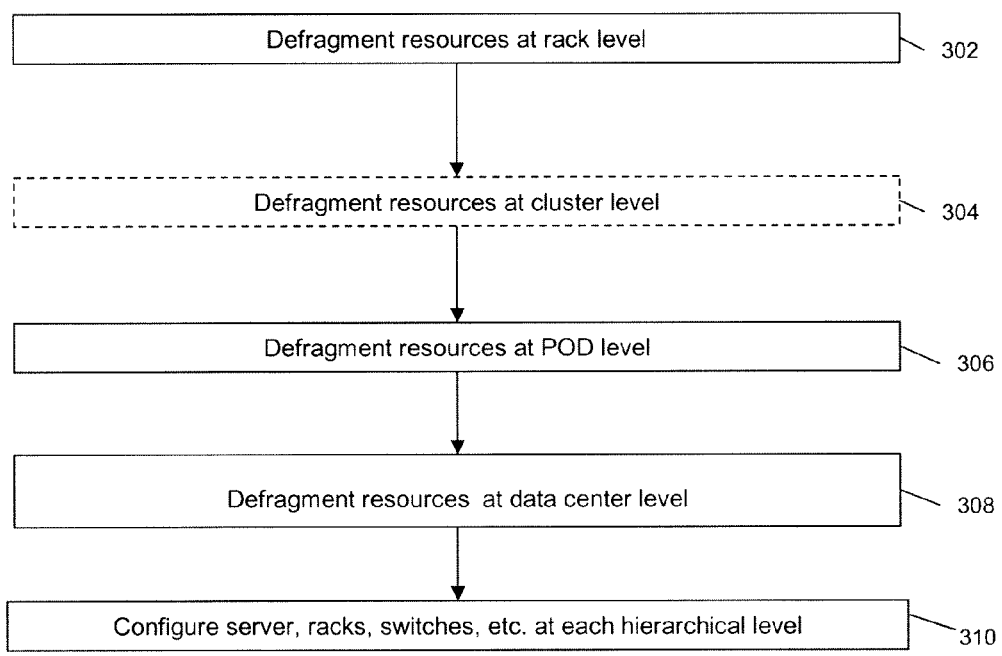
FIG. 3 is an example of a generalized flow chart depicting operations performed by a resource manager to effect resource defragmentation in a cloud computing system.

FIG. 3 is a high level depiction of a series of steps (or operations) that may be performed by resource managers 200, 300 (in combination or individually) in accordance with one possible implementation. The process depicted shows how defragmentation processing can be performed in a hierarchical manner including at a server level, a cluster level, a POD level, and a data center level, with the ultimate outcome of being able, possibly, to power down or place in standby mode, any one or more devices or pieces of equipment within the cloud computing system that may no longer need to be operating to support all then-existing provisioned resources. As shown, at step 302 rack level processing is performed. That is, defragmentation of resources within a given rack is performed such that individual servers performing computing activities on behalf of client requestors can be optimized in, e.g., fewer servers. In one possible embodiment, each server in a selected rack is analyzed to determine how many slots, e.g., virtual machine instantiations (or storage resources), are not being used at all, and how many slots are idle at a given moment in time. If the number of slots not being used is above a certain threshold and the number of idle slots is sufficiently low, it may be possible to migrate the idle virtual machine instantiations (i.e., slots) to another server within the same rack such that the server being defragmented can thereafter be turned off or put into a standby mode. More specific details regarding a process for defragmenting servers within a rack is described below with reference to FIGS. 4A and 4B.

Still referring to FIG. 3, at step 304, cluster level defragmentation processing may be preformed. Cluster level defragmentation processing may be similar to POD level defragmentation processing discussed next and is not discussed in detail separately herein. At step 306, POD level defragmentation processing is performed. More specifically, after the resources on individual servers within a rack are optimized or defragmented, defragmentation within a POD can take place. That is, the resource manager 200 or 300 can operate to determine whether resources or computing services instantiated on a given rack in a POD can be moved to a different rack within a given POD (the same analysis can be accomplished on groups or clusters of racks). If, indeed, it is possible to migrate all computing services from a first rack to a second rack (and likewise from a first cluster to a second cluster) it may be possible to turn off the power to the first track, or place the first rack in some type of reduced power standby mode. Thus, as a result of performing steps 302, (304) and 306 it may be possible to turn off individual servers and even individual racks within a POD. This can result in significant power savings as well as extended life for cloud computing system equipment since that equipment need not be used as much.

In accordance with embodiments described herein it is also possible, as shown by step 308 of FIG. 3, to perform defragmentation at the data center level. With reference to FIG. 1, edge switch 22(2) includes resource manager 200, which may be configured to perform defragmentation among individual PODs 30(1) . . . 30(n). In other words, resource manager 200 is configured to cause the migration or movement of services being performed in a first POD to a second POD to the extent that it may not be justified for the first POD to continue operation when the second POD has sufficient resources to accommodate all of the computing services that are being performed by the first POD. Thus, as with the rack and POD level defragmentation, it may be possible to switch off or turn off entire PODs resulting in further power savings and increased equipment life within the cloud computing system.

Once the processing at each of the steps 302-308 is complete and any computing services migrated as appropriate, at step 310, servers, racks, switches, etc. can be configured accordingly. For example, these devices might be put into a standby or sleep mode such that in the event additional computing services are needed the equipment can be quickly brought back online.

In sum, and at a high-level, the processing depicted in the flow chart of FIG. 3 comprises methodologies by which non-contiguous resources are made contiguous across servers, racks and PODs, as might be possible. Then, as appropriate, those servers, racks and PODs can be powered down and maintained in reserve for future requests received from clients for cloud computing services.

Figure 4A:
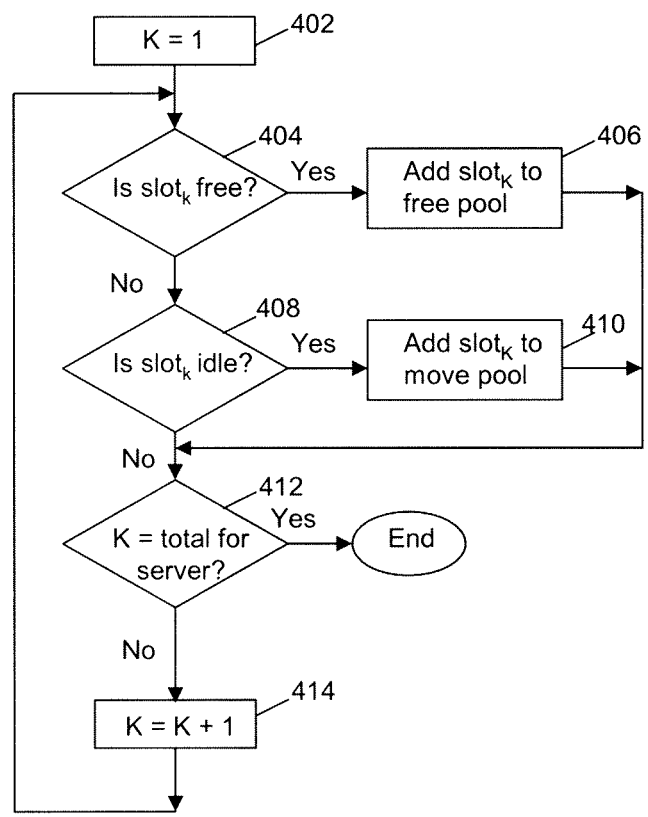
FIGS. 4A and 4B are examples of a generalized flow chart depicting operations performed by a resource manager to effect resource defragmentation at server level in a cloud computing system.

Reference is now made to FIG. 4A. This figure depicts a flow chart that illustrates a process that may be performed to defragment individual servers within a selected rack. More specifically, the process begins, for a first server, at step 402 in which a counter k is initialized to an initial value, e.g., one. It is then determined at step 404 whether $slot_k$ is free. In this context, a "slot" can be a portion of a server that is allocated for an instantiation of e.g., a virtual machine, that may be run on the server. Slots or individual instantiations may be controlled or allocated by a hypervisor that is also operating on the server. As an example, a slot can be considered to be central processing unit (CPU) core plus any associated memory or memory resources on their own. Other "slots" may also be defined and managed in accordance with the principles described herein.

If $slot_k$ is free then that slot may be added to a free pool at step 406. The free pool may be implemented as a separate list in memory, or may simply be a flag associated with the slot that may be managed by the hypervisor or maintained by a resource manager. The next step in the process is step 408, described below. If $slot_k$ were not free at step 404, which means that the slot is being used as, e.g., a virtual machine, the process proceeds to step 408 where it is determined whether $slot_k$ is in an idle state. In other words, it is determined whether the instant slot is in a state amenable to being moved or migrated to a second server within the same rack since it is not presently being actively used. If so, the process moves to step 410 where that slot is added to a move pool. The move pool may be implemented similarly to the free pool. The process then continues with step 412 in which it is determined whether all of the slots have been accounted for on the first server. If yes, the process ends. Otherwise, the value k is incremented at step 414 and the process returns to step 404 to determine whether the next slot is free or not, etc.

Figure 4B:
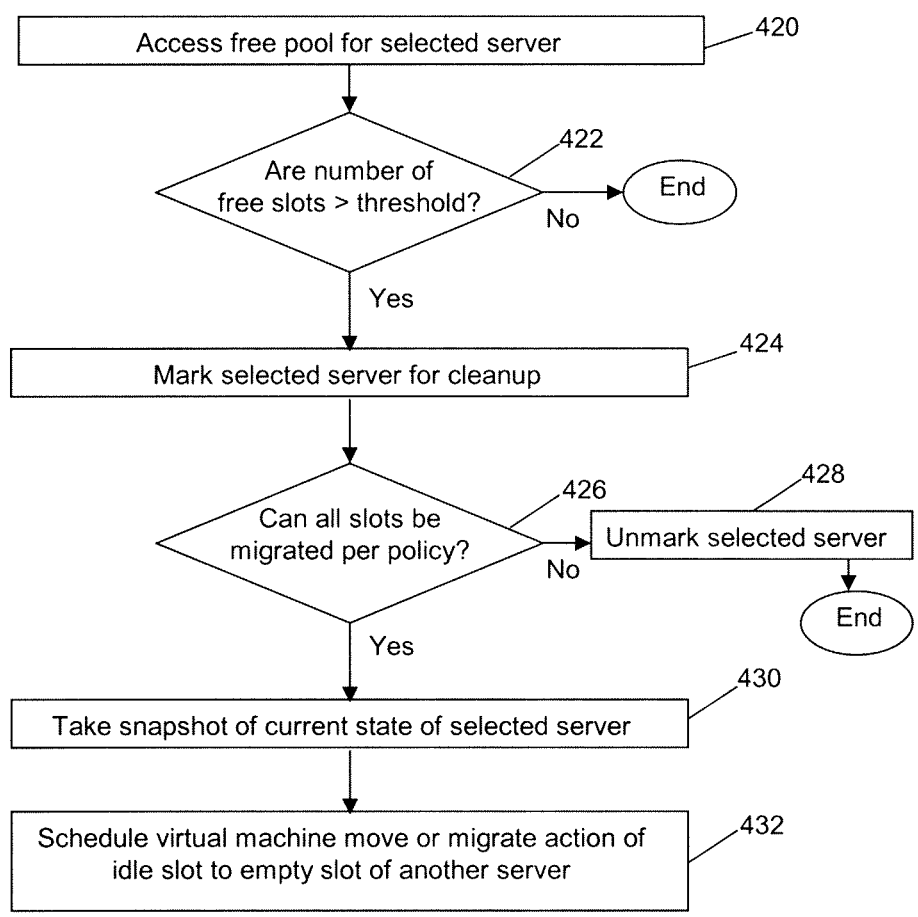

Once the process of FIG. 4A is completed for at least two servers within a given rack, it is possible to determine whether it might be possible to move or migrate computing services operating on a first server to a second server such that the first server can be turned off, powered down, etc. That is, it is determined whether a second server can accommodate all of the services that are currently operating on the first server. Initially, however, and as shown in FIG. 4B, it is determined whether the first server is a candidate for clean up or defragmentation. Thus, at step 420, the free pool for a first or selected server is accessed. Then at step 422 it is determined whether the number of free slots for the first server is greater than a predetermined threshold. For example, a server might be able to accommodate a total of 128 slots. If 100 of those slots were free, this might indicate that the first server is a good candidate for cleanup or defragmentation since only a small number of the total available slots are actually in use. If the number of free slots is not greater than the predetermined threshold then the process ends and a next server is analyzed. However, if the number of free slots is greater than the predetermined threshold then the server may be marked for cleanup at step 424.

The process then continues with step 426 where it is determined whether those slots that are not free can be moved or migrated based on any pre-existing policy that an end user or cloud computing services manager has instituted. Such a policy might be resident within policy engine 70. The policy engine 70 could be made available to end users or to cloud computing system managers to establish desired polices regarding resource migration, among other possible policy directives. As an example, an end user might have required that his requested computing services be operated on a very specific server or set of servers and migrating those services to an alternate server, even though the alternate server might be particularly suitable for performing the computing tasks, might thus be prohibited. Consequently, if even one slot cannot be moved then it may not be of any use to continue finding "new homes" on other servers for the other slots. As such, if not all of the slots are in a position to be moved, then the process continues with step 428 where the server is unmarked for cleanup after which the process ends.

If all of the slots at step 426 are eligible to be moved or migrated, then at step 430 a snapshot of the current state of the server may be taken. This snapshot can be used at some future time in the event the migration of the computing services in the slots being used needs to be rolled back. Finally, at step 432, the resource manager can schedule a move or migration for each virtual machine running in a slot that is in an idle state. Any slot that is in an active state can be monitored and when a virtual machine in that slot enters an idle state the move or migration can be effected.

Selecting which server the virtual machines in the slots on the marked for cleanup server should be moved to can be based on any number of considerations. For example, the resource manager might identify a second server with the fewest number of slots in use. Such a server might be used as a "receiver" server such that it receives migrated slots from any number of servers that have been marked for cleanup. Alternatively, some predetermined number of specific severs may be designated as "receiver" servers and those servers are always first employed to receive migrated slots. In this way, managing which servers are to be the recipients of migrated slots is simplified. As still another alternative, "receiver" servers might be selected based on a round robin technique such that each server in a given rack is designated as a "receiver" server for some predetermined amount of time or iteratively.

Once defragmentation of all servers in all desired racks is complete, it is possible to then determine whether it might be feasible to move the computing services operating on a first rack to a second rack such that the first rack can be turned off or powered down. In other words, it is possible to conduct or perform POD level defragmentation by defragmenting racks or clusters of racks. In one possible implementation, it is first determined which racks have relatively few servers with active virtual machines or a low number of allocated slots. In addition, because not all computing services are alike, the total uplink bandwidth allocated for all resources in the rack to be analyzed is determined. That is to say, while it may be possible to move all the services of a first rack to a second rack of servers, the second rack might simply not have enough uplink bandwidth to accommodate all of the services of the first rack. For example, the first rack might support multiple Web servers that require significant uplink bandwidth capacity to accommodate the multiple requests from browser applications. Accordingly, if the second rack is already supporting similar Web servers, the second rack might not be able to handle the increase in web traffic.

Figure 5:
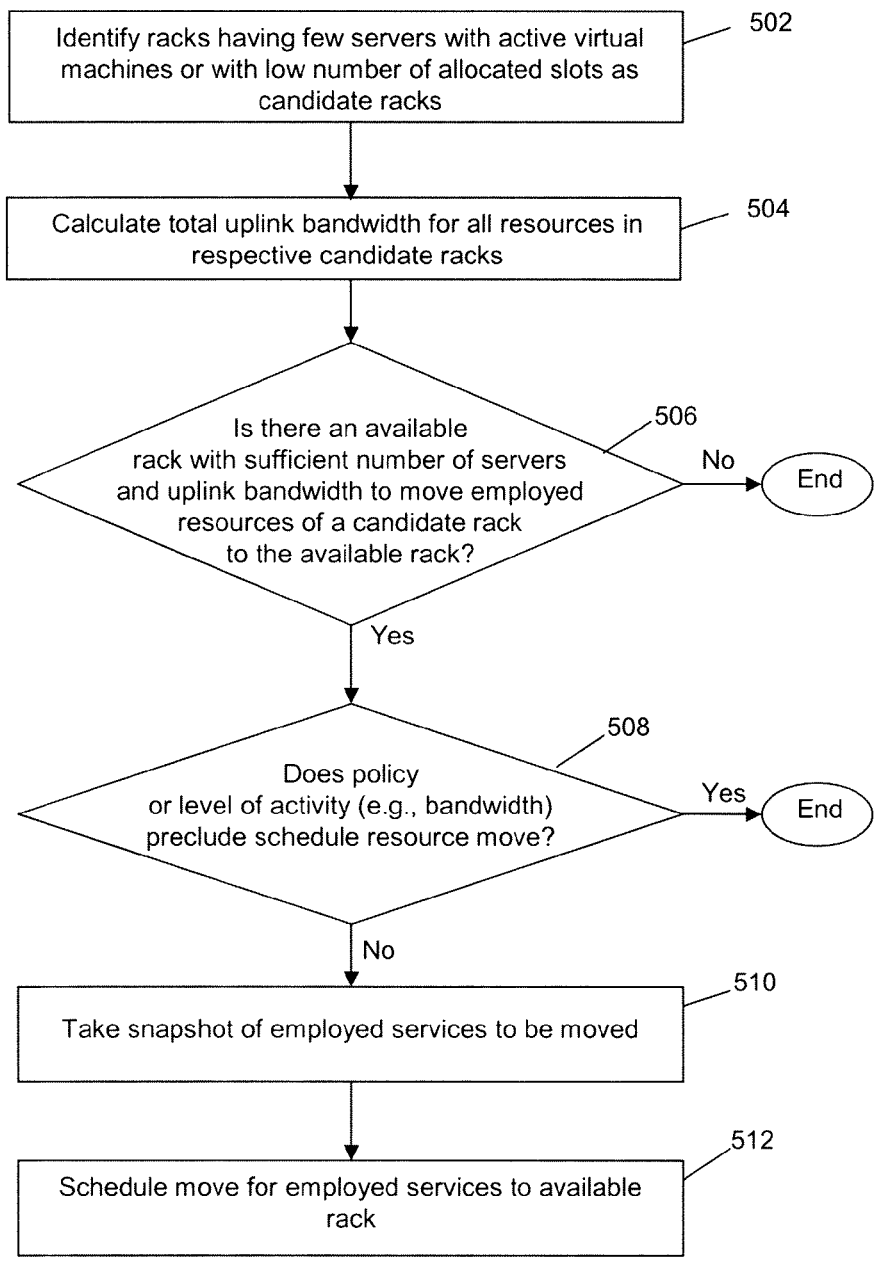
FIG. 5 is an example of a generalized flow chart depicting operations performed by a resource manager to effect resource defragmentation at a POD level in a cloud computing system.

Reference is now made to FIG. 5, which depicts an example series of steps for performing POD level defragmentation. This process may be carried out by, e.g., resource manager 300 disposed within, e.g., core/aggregation switch 32(2) or some other device within the POD level 30 of the cloud computing hierarchy. The process begins at step 502 where racks having servers with relatively few active virtual machines or having a low number of allocated slots are identified as being candidate racks for defragmentation. At step 504, the total uplink bandwidth for all resources in the respective candidate racks is calculated. A table listing all racks and their respective uplink bandwidths can be maintained in memory as needed for this purpose. With this information, at step 506 it is determined whether there is an available rack (or cluster) having a sufficient number of available slots/servers and uplink bandwidth to receive all of the employed resources (active/idle slots) of a candidate rack. If there are no such available racks in the POD then the process ends as there is no further defragmentation that is possible within the POD. That is, no rack within the POD is available to accommodate all of the resources that are being supplied by the candidate rack. In other words, it might be said that the POD is operating in as an efficient manner as is possible at the time the analysis of the multiple racks within the POD is conducted.

On the other hand, if at least one rack within the POD is available to accommodate the resources being supplied by the candidate rack, then the process moves to step 508 at which it is determined whether any policies are in place that would prohibit the movement of the resources on the candidate rack to an identified available rack. That is, as with the movement or migration of resources or slots in connection with server defragmentation within a rack, there is also the possibility that predetermined policies, put in place by an end user or by a cloud computing service manager via policy engine 70, might forbid the movement of resources from a given rack of servers to any arbitrary rack of servers that might happen to be available to support the same level of service. Such policies might include service level agreements or other policies or agreements then in force.

Of course, rather than going through the analysis to determine whether a given rack is a potential candidate rack, it is possible that the resource manager 300 might itself maintain (or have access to) a table or data that identifies all racks for which migration would not be allowed despite the fact that the rack is not being utilized in the most efficient manner. In this way, the overall defragmentation process can be optimized by avoiding analyzing any racks that happen to be listed in the table.

Assuming no policies or service level agreements conflict with a possible move of resources from one rack to another, step 510 is performed in which a snapshot of the candidate rack may be made and stored so that in the event the movement or migration of the services from the candidate rack to the available rack needs to be reversed, such a reversal can be easily effected.

Finally, at step 512, the resource manager 300 causes a migrate or move process to be scheduled to migrate all of the resources on the candidate rack to the identified available rack. To the extent slots on the servers in the candidate rack are in an idle state, those slots can be moved or migrated as soon as practical. However, where certain servers or slots within a rack are in an active state then it may be necessary to delay the virtual machine or storage migration from the candidate rack to the available rack until such time as the active virtual machines enter an idle state.

With the servers in each rack defragmented and each rack within a POD defragmented it is also possible using resource manager 200 at the data center level 20 to perform defragmentation or consolidation of entire PODs. This can be accomplished by analyzing available space within individual PODs and the utilization of respective PODs. If a first POD has a smaller number of resources being used than the available resources at a second POD, then, in accordance with an embodiment, all of the employed resources at the first POD can be moved or migrated to the second POD, assuming there is no policy conflict.

It should be noted that the strategy used for defragmentation may be related to factors that dictate the initial provisioning of resources in the servers, racks and PODs in the first place. For example, if latency is a factor considered during resource provisioning then latency can also be considered in determining whether a migration or move of those same resources is appropriate. If a move will result in a latency that does not meet the end user's criteria then the move need not be scheduled. This is akin to satisfying any other policy that might be in force at the time a potential move is considered.

Thus, as has been explained, the defragmentation functionality can be handled by a resource manager component within the cloud computing system. Such a resource manager has access to the resources that are currently used (via, e.g., a Dependency Tracker) and resources that are free (via, e.g., a Capability Directory) which can be leveraged for the defragmentation techniques described herein.

In one possible implementation, the defragmentation is performed in a hierarchical manner, namely, first moving resources amongst servers on the same rack to free up servers, then moving resources used within a cluster to free up racks, then moving resources used within a POD to free up clusters, and finally moving resources used across PODs to free up a POD. Those skilled in the art will appreciate that this is but just one example of a possible hierarchical approach to defragmenting resources within a cloud computing system.

The systems and processes described herein provide an approach for resource aggregation within data centers of a cloud computing network by removing or eliminating small chunks of resources that might lead to waste of resources or subsequent sub-optimal resource allocation. Also, the methodologies described herein can be used to selectively switch off, or power down, racks and switches and conserve energy in a data center.

The above description is intended by way of example only.

What is claimed is:

1. A method comprising:
   at a device in a cloud computing system, the cloud computing system comprising a plurality of servers deployed in a plurality of respective racks, wherein the respective racks are deployed in a pod of a data center, determining for each server in a given rack of servers a number of free resource slots available thereon and a number of resource slots in an idle state by adding to a free pool free resource slots and adding to a move pool resource slots that are in the idle state;
   determining whether the number of free resource slots in the free pool for a first server in the plurality of servers is greater than a predetermined threshold, the predetermined threshold being indicative that the first server is a candidate to be powered down;
   when the number of free resource slots in the free pool for the first server is greater than the predetermined threshold, identifying a second server in the plurality of servers with sufficient resource slots thereon to accommodate the number of resource slots in the idle state that are in the move pool for the first server; and
   causing the resource slots in the idle state on the first server to be migrated to the second server,
   wherein the second server is selected based on a round robin technique such that each server among the plurality of servers is a candidate to be selected as the second server for a predetermined amount of time.

2. The method of claim 1, wherein identifying the second server comprises identifying the second server within a same rack as the first server.

3. The method of claim 1, further comprising taking a snapshot of a state of the first server before resource slots are migrated from the first server to the second server.

4. The method of claim 1, further comprising before causing the resource slots in the idle state on the first server to be migrated to the second server, determining whether migrating the resource slots in the idle state on the first server violates any policy governing the operation of the resource slots in the idle state on the first server.

5. The method of claim 1, further comprising, after resource slots in the idle state on the first server are migrated to the second server, causing a rack in which the first server is located to be powered down.

6. The method of claim 1, further comprising, after resource slots in the idle state on the first server are migrated to the second server, causing a pod in which the first server is located to be powered down.

7. The method of claim 1, further comprising determining a utilization bandwidth for a first rack in which the first server is located, and migrating resources from the first rack to a second rack only when an available bandwidth in the second rack can accommodate the utilization bandwidth for the first rack.

8. The method of claim 1, wherein the free resource slots or the resource slots in an idle state comprises storage resources.

9. One or more non-transitory computer-readable storage media storing instructions that, when executed by a processor, cause the processor to:
   at a device in a cloud computing system, the cloud computing system comprising a plurality of servers deployed in a plurality of respective racks, wherein the respective racks are deployed in a pod of a data center, determine for each server in the plurality of servers a number of free resource slots available thereon and a number of resource slots in an idle state by adding to a free pool free resource slots and adding to a move pool resource slots that are in the idle state;
   determine whether the number of free resource slots in the free pool for a first server in the plurality of servers is greater than a predetermined threshold, the predetermined threshold being indicative that the first server is a candidate to be powered down;
   when the number of free resource slots in the free pool for the first server is greater than the predetermined threshold, identify a second server in the plurality of servers with sufficient resource slots thereon to accommodate the number of resource slots in the idle state that are in the move pool for the first server; and
   cause the resource slots in the idle state on the first server to be migrated to the second server,
   wherein the second server is selected based on a round robin technique such that each server among the plurality of servers is a candidate to be selected as the second server for a predetermined amount of time.

10. The computer-readable storage media of claim 9, wherein the instructions, when executed, cause the processor to identify the second server within a same rack as the first server.

11. The computer-readable storage media of claim 9, wherein the instructions, when executed, cause the processor to take a snapshot of a state of the first server before resource slots are migrated from the first server to the second server.

12. The computer-readable storage media of claim 9, wherein the instructions, when executed, cause the processor to before causing the resource slots in the idle state on the first server to be migrated to the second server, determine whether migrating the resource slots in the idle state on the first server violates any policy governing the operation of the resource slots in the idle state on the first server.

13. The computer-readable storage media of claim 9, wherein the instructions, when executed, cause the processor to add to a list of free slots each free resource slot available on the first server, and add to a list of candidate move slots each resource slot in the idle state.

14. The computer-readable storage media of claim 9, wherein the instructions, when executed, cause the processor to, after resource slots in the idle state on the first server are migrated to the second server, cause a rack in which the first server is located to be powered down.

15. The computer-readable storage media of claim 9, wherein the instructions, when executed, cause the processor to, after resource slots in the idle state on the first server are migrated to the second server, cause a pod in which the first server is located to be powered down.

16. The computer-readable storage media of claim 9, wherein the instructions, when executed, cause the processor to determine a utilization bandwidth for a first rack in which the first server is located, and migrate resources from the first rack to a second rack only when an available bandwidth in the second rack can accommodate the utilization bandwidth for the first rack.

17. An apparatus comprising:
   a network interface unit configured to perform communications over a network;
   a processor configured to be coupled to the network interface unit, wherein the processor is configured to:
      determine for each server in a plurality of servers a number of free resource slots available thereon and a number of resource slots in an idle state by adding to a free pool free resource slots and adding to a move pool resource slots that are in the idle state;
      determine whether the number of free resource slots in the free pool for a first server in the plurality of servers is greater than a predetermined threshold, the predetermined threshold being indicative that the first server is a candidate to be powered down;
      when the number of free resource slots in the free pool for the first server is greater than the predetermined threshold, identify a second server in the plurality of servers with sufficient resource slots thereon to accommodate the number of resource slots in the idle state that are in the move pool for the first server; and
      cause the resource slots in the idle state on the first server to be migrated to the second server,
      wherein the second server is selected based on a round robin technique such that each server among the plurality of servers is a candidate to be selected as the second server for a predetermined amount of time.

18. The apparatus of claim 17, wherein the processor is further configured to identify the second server within a same rack as the first server.

19. The apparatus of claim 17, wherein the processor is further configured to before causing the resource slots in the idle state on the first server to be migrated to the second server, determine whether migrating the resource slots in the idle state on the first server violates any policy governing the operation of the resource slots in the idle state on the first server.

20. The apparatus of claim 17, wherein the processor is further configured to determine a utilization bandwidth for a first rack in which the first server is located, and migrate resources from the first rack to a second rack only when an available bandwidth in the second rack can accommodate the utilization bandwidth for the first rack.

* * * * *